(12) United States Patent
Fukuoka

(10) Patent No.: US 7,918,030 B2
(45) Date of Patent: Apr. 5, 2011

(54) CUTTING TOOLS HAVING LIGHTING DEVICES

(75) Inventor: Toru Fukuoka, Aichi-ken (JP)

(73) Assignee: Makita Corporation, Anjo-shi, Aichi-ken (JP)

( * ) Notice: Subject to any disclaimer, the term of this patent is extended or adjusted under 35 U.S.C. 154(b) by 0 days.

(21) Appl. No.: 10/209,665

(22) Filed: Aug. 1, 2002

(65) Prior Publication Data
US 2003/0024368 A1 Feb. 6, 2003

(30) Foreign Application Priority Data
Aug. 3, 2001 (JP) .................. 2001-236417

(51) Int. Cl.
*B27B 9/00* (2006.01)
(52) U.S. Cl. ................. 30/388; 30/376; 83/520
(58) Field of Classification Search .......... 30/391, 30/388, 123, DIG. 1, 376; 362/33, 227, 232; 83/520, 13, 471, 471.3, 331, 698.41, 521
See application file for complete search history.

(56) References Cited

U.S. PATENT DOCUMENTS

| 2,488,947 A | 11/1949 | Vavrik |
| 2,517,882 A | 8/1950 | Johnson |
| 2,806,492 A * | 9/1957 | Becker .................. 83/520 |
| 2,852,051 A * | 9/1958 | Bickner .................. 144/136.1 |
| 4,803,599 A * | 2/1989 | Trine et al. .................. 362/249 |
| 4,833,782 A | 5/1989 | Smith |
| 5,169,225 A * | 12/1992 | Palm .................. 362/118 |
| 5,461,790 A * | 10/1995 | Olstowski .................. 30/391 |
| 5,675,899 A * | 10/1997 | Webb .................. 30/390 |
| 5,699,705 A | 12/1997 | Sibbet |
| 6,055,734 A * | 5/2000 | McCurry et al. .................. 30/391 |
| 2001/0029819 A1 | 10/2001 | Okouchi |

FOREIGN PATENT DOCUMENTS

| DE | 9107667 | 9/1991 |
| EP | 0073693 | 3/1983 |
| EP | 0504745 | 9/1992 |
| WO | WO99/02310 | 1/1999 |

* cited by examiner

*Primary Examiner* — Phong H Nguyen
(74) *Attorney, Agent, or Firm* — Dennison, Schultz & MacDonald

(57) ABSTRACT

Cutting tools (1) may include a lighting device (5). The lighting device may be mounted on a tool unit (3) adjacent to a grip portion (26). Preferably, the grip portion serves to protect the lighting device from being damaged by an external force. The tool unit may include a motor case (21) for accommodating a motor. The grip portion may extend from the motor case and the lighting device may be mounted on or within the motor case. The tool unit may further include a blade case (20) that at least partly covers a cutting blade (22). The blade case may be joined to the motor case via a joining portion J defined on the motor case. In this case, the lighting device is preferably disposed proximal to the joining portion. The lighting device may include at least a first light (5a) and a second light (5b) that are arranged and constructed to illuminate different areas.

25 Claims, 5 Drawing Sheets

FIG. 2

CUTTING TOOLS HAVING LIGHTING DEVICES

This application claims priority to Japanese patent application serial number 2001-236417, which was filed Aug. 3, 2002, the contents of which are incorporated herein by reference.

BACKGROUND OF THE INVENTION

1. Technical Field

The present invention relates to cutting tools, such as portable circular saws, and more particularly, to cutting tools having one or more lights that serve to illuminate an area around a portion of a workpiece, e.g., a portion of a workpiece that will be cut during a cutting operation.

2. Description of the Related Art

Japanese Laid-Open Patent Publication No. 11-170203 teaches a portable circular saw that includes a lighting device. The lighting device is mounted on a front portion of a saw unit and is disposed laterally of a portion of a workpiece that will be cut by a front or leading portion of a circular saw blade. More specifically, the lighting device is disposed on a pivotal support that is mounted on a base (shoe) of the circular saw, which base pivotably supports the saw unit. Therefore, the lighting device can illuminate the portion of the workpiece being cut during the cutting operation and the cutting operation can be performed by visually aligning the position of the front or leading portion of the circular saw blade with a cutting line drawn on the workpiece.

However, as described above, the lighting device of the above publication is mounted on the pivotal support of the saw unit. In particular, the lighting device is mounted on a pivotable arm of the pivotal support, which pivotable arm extends forwardly of a motor case (housing) of the circular saw. Because the pivotable arm has opposing arm portions disposed at positions displaced laterally of the portion of the workpiece that is cut during the cutting operation, the use of the pivotable arm as a mounting portion of the cutting device is advantageous to illuminate the cut portion from a position that is not far from the cut portion. However, because the pivotal arm is positioned so as to extend from the motor case, the pivotable arm naturally has relatively low strength or low durability. Thus, if the circular saw is, e.g., accidentally dropped, the pivotable arm will likely receive a relatively large impact force due to its configuration and the mounted position. As a result, a possibility exists that the pivotable arm will be damaged and the lighting device will be exposed to the outside if the circular saw happens to be dropped.

SUMMARY OF THE INVENTION

It is, accordingly, one object of the present invention to teach improved cutting tools that can more effectively protect a lighting device from damage due to an accidental external force that may be applied to the cutting tool.

According one aspect of the present teachings, cutting tools arc taught that provide increased durability for a lighting device. For example, cutting tools are taught that may include a lighting device that is mounted on a tool unit adjacent to a grip portion (or auxiliary handle portion). In this case, the grip or auxiliary handle portion will protect the lighting device from being damaged, in the event that an external force is applied to the cutting tool. Therefore, possible damage to the lighting device can be minimized or prevented, even if the cutting tool is accidentally dropped.

In another aspect of the present teachings, the lighting device may be mounted on a motor case (motor housing), such as at a joining portion (joining surface) that is defined on the motor case for joining or attaching the motor case to a blade case (blade housing). The joining portion may preferably be designed so as to have a strength that is greater than the other portions of the motor case. Therefore, the lighting device can be protected from externally applied forces by disposing the lighting device at or near the joining portion.

In another aspect of the present teachings, a shoe (base) may be coupled to the tool unit via a mount (support arm) that extends from a portion of the motor case. The lighting device may be disposed at a portion of the cutting tool that is between the grip or auxiliary handle portion and the mount, which parts may constitute two projections extending from the motor case. Therefore, it is possible to significantly reduce (or eliminate) the possibility that the lighting device will contact an external object, such as a floor of a workplace, in the event that the cutting tool is accidentally dropped.

Additional objects, features and advantages of the present invention will be readily understood after reading the following detailed description together with the claims and the accompanying drawings.

BRIEF DESCRIPTION OF THE DRAWINGS

FIG. 2 is a plan view of the representative circular saw;

DETAILED DESCRIPTION OF THE INVENTION

Figure 1:
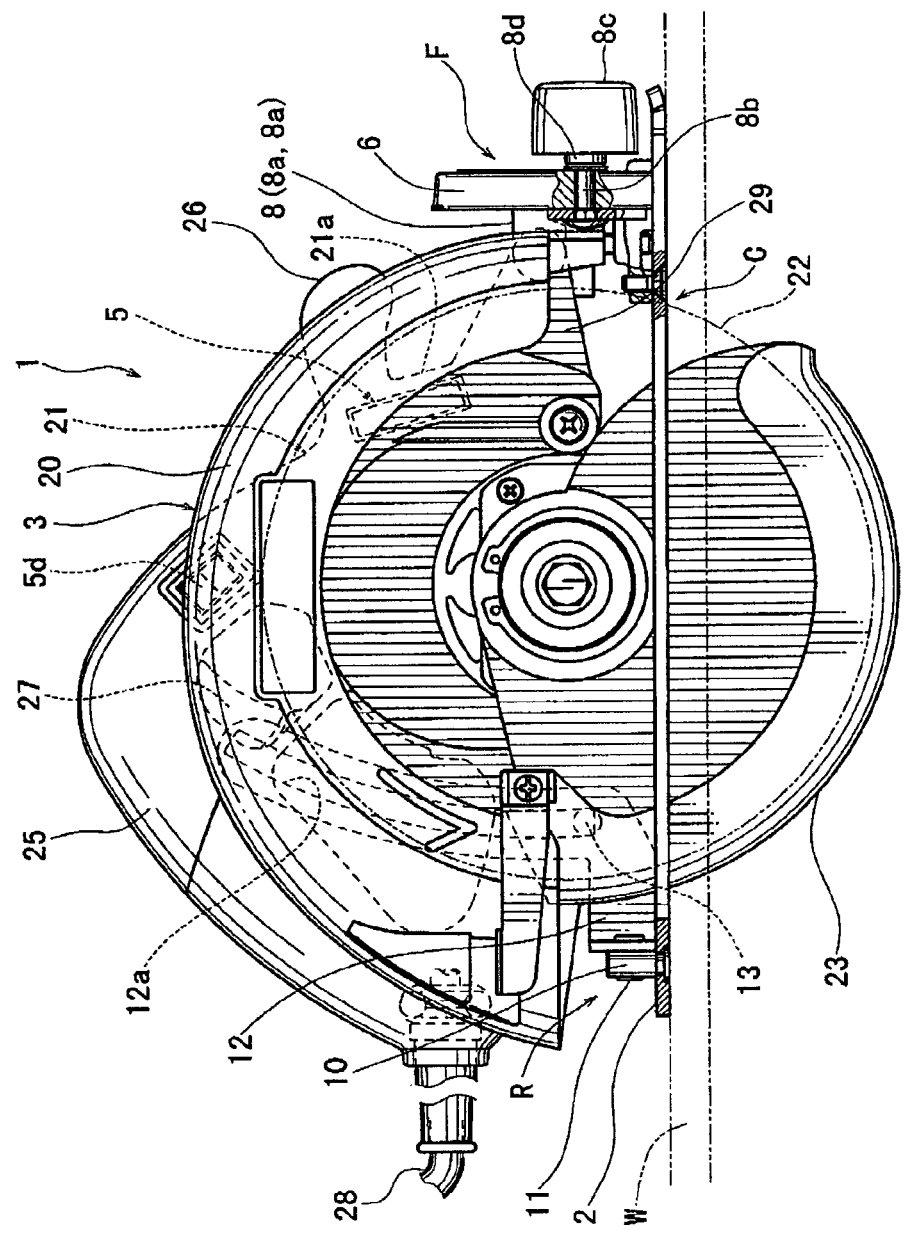
FIG. 1 is a side view of a representative circular saw.

Cutting tools are taught that include a motor case (motor housing) and a blade case Glade housing). The motor case may accommodate a motor and may include a joining portion (joining surface) that is designed to be joined or affixed to the blade case. A grip portion (auxiliary handle) may extend from the motor case and is preferably designed to be grasped by an operator of the cutting tool. The grip portion may include a grip base defined on one side of the motor case. A lighting device may be disposed on the motor case in a position that is adjacent or proximal to both the joining portion and the grip base. The joining portion preferably is designed so as to be more resilient (durable) or stronger than the other portions of the motor case. Preferably, the grip portion may be designed so as to contact the floor before the lighting device contacts the floor, in the -event that the cutting tool is accidentally dropped. In this case, the lighting device can be reliably protected so as not to be damaged by the externally applied force caused by the drop. As a result, it is possible to improve the durability of the cutting tool and the lighting device.

In another embodiment of the present teachings, a mount (support arm) may extend from or be coupled to the motor case and may be disposed adjacent or proximal to the grip portion. The motor case may be supported by a shoe (base) via the mount. Further, the lighting device may be disposed between a base portion of the grip and a base potion of the mount. Therefore, the lighting device may be protected or shielded between the grip portion and the mount.

In another embodiment of the present teachings, a front or leading edge of a blade disposed, e.g., rotatably disposed, within the blade case may be positioned forward of the lighting device. Cutting chips generated during a cutting operation typically scatter toward the front side of the blade, e.g., a circular saw blade. Therefore, the cutting chips generally will not reach the lighting device, or a transparent cover that protects the lighting device, if the leading edge of the blade is disposed forwardly of the lighting device. As a result, the lighting device preferably is not damaged or obscured by the cutting chips generated during a cutting operation.

In another embodiment of the present teachings, the lighting device may include a first light and a second light. The first light may be directed to illuminate a portion of a workpiece that will be cut. The second light may be directed to illuminate an alignment edge that is defined on the shoe for alignment with a cutting line drawn on the workpiece. In most known circular saw designs, the grip portion is positioned at a higher level than the cut portion of the workpiece and the alignment edge. Therefore, in the present embodiment, the lighting device can illuminate the cut portion and the alignment edge obliquely from the upper side. As a result, light from the lighting device preferably does not directly shine towards the eyes of the operator during the cutting operation.

In another embodiment of the present teachings, an exhaust window may be defined within the blade case. Cooling air may flow around the motor and then may be discharged from the exhaust window. The lighting device may be positioned adjacent or proximal to the exhaust window. Therefore, the cooling air exhausted from the exhaust window may clear off (forcibly remove) any cutting chips that may reach the lighting device. Consequently, this design feature also assists in preventing the lighting device from being damaged or obscured (covered) by the cutting chips generated during the cutting operation. Preferably, the cooling air may be directed to flow substantially along a cover of the lighting device. The cover may be substantially transparent.

In another embodiment of the present teachings, the first light and/or the second light may comprise a light emitting diode (LED), because LEDs typically generate less heat than other types of lights, such as incandescent lights. Therefore, if one or more LEDs are utilized, the lighting device will not generate significant heat, which heat could be conducted to the grip portion that will be held by the operator during the cutting operation.

In another embodiment of the present teachings, a main handle may extend from the motor case and a lighting switch may be mounted on the main handle. The lighting switch may be electrically connected to the lighting device and may be operable to turn ON and OFF the lighting device. Therefore, the wiring operation between the lighting switch and the lighting device can be facilitated. In the present specification, the main handle may also be referred to as a rear handle and the grip portion (or auxiliary handle) may also be referred to as a front handle. Thus, cutting tools of the present teachings may include a front handle and a rear handle. In this case, the operator may hold the front handle with one hand and may hold the rear handle with the other hand during a cutting operation.

The present cutting tools may operate using a commercial power supply, such as an alternating current (AC) of, e.g., 100 volts, 115 volts or 220 volts. In the alternative, the cutting tools may be "cordless" and may operate using a rechargeable battery, such as a nickel-cadmium or nickel metal-hydride battery. The present teachings may be advantageously utilized with both types of power tool designs.

Each of the additional features and teachings disclosed above and below may be utilized separately or in conjunction with other features and teachings to provide improved cutting tools and methods for designing and using such cutting tools. Representative examples of the present invention, which examples utilize many of these additional features and teachings both separately and in conjunction, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 2:
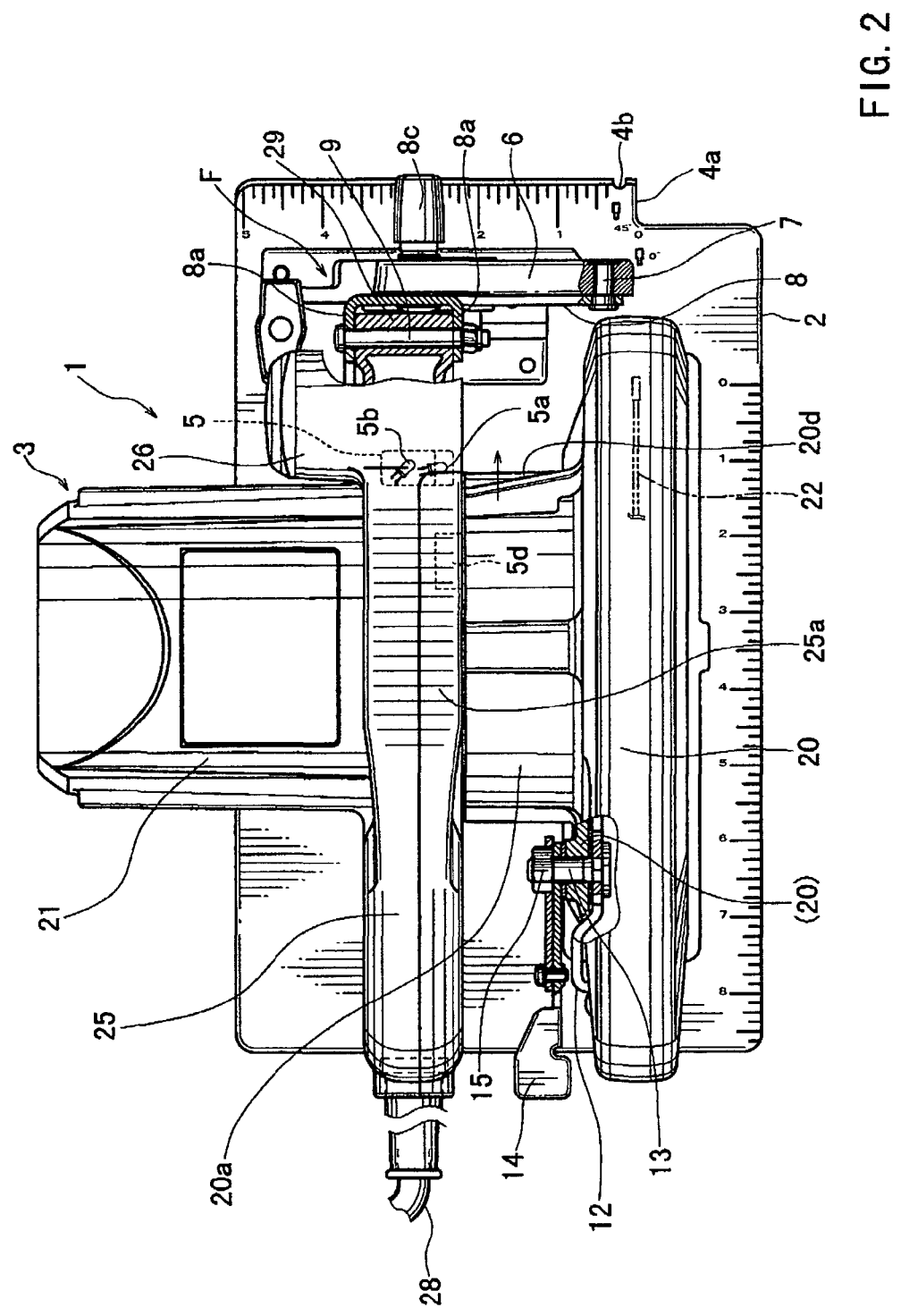

A detailed representative embodiment of a portable circular saw according to the present teachings will now be described with reference to the drawings. Referring to FIGS. 1 and 2, the representative portable circular saw 1 is designed as a woodworking saw and may generally comprise a shoe (base) 2, which optionally may be pivotally coupled to a saw unit 3. In the alternative, the shoe 2 may be fixedly coupled to the saw unit 3, if only vertical cutting operations are desired. The shoe 2 is preferably configured to support the saw unit 2 on a workpiece W that will be cut. In this embodiment, the saw unit 3 is laterally pivotally mounted on the shoe 2. The representative portable circular saw 1 also may include a lighting device 5 that serves to illuminate the portion of the workpiece W that will be cut by a front or leading edge (right edge portion as viewed in FIG. 1) of a circular saw blade 22 mounted within the saw unit 3. The lighting device 5 also may serve to illuminate first and second alignment edges 4a and 4b, which optionally may be defined on the front end (right end as viewed in FIG. 1) of the shoe 2. The first and second alignment edges 4a and 4b may be configured so as to align with a cutting line (not shown) that has been marked or drawn on the workpiece W. In this specification, the term "cutting direction" is intended to mean the direction of movement of the circular saw 1 for cutting the workpiece W during the cutting operation. Thus, the rightward direction as viewed in FIGS. 1 and 2 corresponds to the cutting direction for the representative circular saw 1.

The first alignment edge 4a of the shoe 2 may be used when a vertical cutting operation is performed and the circular saw blade 22 extends substantially perpendicularly (vertically) relative to the shoe 2. Furthermore, the second alignment edge 4b may be used when an oblique (bevel) cutting operation is performed and the circular saw blade 22 is inclined laterally relative to the shoe 2. In order to cut the workpiece W, the shoe 2 of the circular saw 1 may be placed on the workpiece such that one of the first and second alignment edges 4a, 4b aligns with the corresponding cutting line marked on the workpiece W. Then, the operator starts a motor (not shown) so as to begin rotating the circular saw blade 22. If a vertical cutting operation will be performed, the operator moves the circular saw 1 in the cutting direction (rightward direction in the embodiment) with the first alignment edge 4a aligned with the corresponding cutting line. If an oblique (bevel) cutting operation will be performed, the operator moves the circular saw 1 in the cutting direction with the second alignment edge 4b aligned with the corresponding cutting line. For example, the circular saw blade 22 may be inclined at an angle of 45° during the oblique (bevel) cutting operation.

In order to laterally incline the circular saw blade 22, a front pivotal support F and a rear pivotal support R may be respectively disposed on the front portion and the rear portion of the shoe 2. Thus, the front pivotal support F and the rear pivotal support R may laterally pivotally support the saw unit 3. For example, the front pivotal support F may be positioned on the rear side of the first and second alignment edges 4a and 4b and may include an upright support base (guide plate) 6 that extends vertically upward (perpendicularly) from the upper surface of the shoe 2. A pivotable bracket 8 may be vertically pivotally mounted on the rear side of the support base 6 via a support shaft 7. The vertical pivoted position of the pivotable bracket 8 relative to the support base 6 may be fixed by tightening a nut 8d against a bolt 8b that may be mounted on the bracket 8. In order to facilitate the tightening and loosening operation of the nut 8d, a knob & may be attached to the nut 8d.

A pair of parallel support edges 8a may project from the upper portion of the bracket 8 and may extend rearward of the bracket 8. A support shaft 9 may be supported between the support edges 8a and may vertically pivotally support a pivotable arm 29 that is disposed at a front portion of the saw unit 3. As shown in FIG. 2, the support shaft 9 preferably extends substantially perpendicular with respect to the support shaft 7.

The rear pivotal support R may include a support base 10 that is affixed to the upper surface of the shoe 2. A guide bracket 12 may be pivotally mounted on the support base 10 via a support shaft 11. In this case, the guide bracket 12 may be inclined laterally rightward (downward as viewed in FIG. 2) relative to the support base 10. For example, the support shaft 11 of the rear pivotal support R may be positioned on the same axis as the support shaft 7 of the front pivotal support F. The saw unit 3 may also include a blade case (blade housing) 20. A bolt 13 may be mounted on the rear side of the blade case 20. A nut 15 may be tightened against the bolt 13, so that the guide bracket 12 can be fixed in position relative to the blade case 20. A lever 14 may be attached to the nut 15, so that the nut 15 can be tightened and loosened by pivoting the lever 14 in the upward and downward directions.

A vertically elongated arc-shaped guide slot 12a may be defined within the guide bracket 12. The bolt 13 may extend through the guide slot 12a. As a result, the vertical pivotal position of the blade case 20, i.e. the saw unit 3, can be adjusted within the range that the bolt 13 can slide along the guide slot 12a. The bolt 13 and nut 15 also may be replaced with a lock screw or other releasable fastening means.

As described above, the pivotable bracket 8 of the front pivotal support F is vertically pivotally supported about the support shaft 7. In addition, the guide bracket 12 of the rear pivotal support R is laterally pivotally supported about the support shaft 9. Therefore, the circular saw blade 22 of the saw unit 3 can be set to a vertical position or a laterally inclined position with respect to workpiece W in order to respectively perform a vertical cutting operation or an oblique (bevel) cutting operation.

Further, the saw unit 3 can be vertically pivoted about the support shaft 9 by loosening the nut 15. In this case, the amount that the lower edge of the circular saw blade 22 protrudes or projects from the lower surface of the shoe 2 can be changed in order to adjust the cutting depth of the circular saw blade 22 into the workpiece W.

In addition to the blade case 20, the saw unit 3 may include a motor case (motor housing) 21 that accommodates an electric motor (not shown). A substantially cylindrical gear case (gear housing) 20a may be formed integrally with the left side portion of the blade case 20, as shown in FIG. 2. The motor case 21 may be joined or attached to the gear case 20a via a butt joint. In this case, the motor case 21 optionally may be attached or joined to the blade case 20 via the gear case 20a. The rotational speed of the motor within the motor case 21 optionally may be reduced using a gear train (not shown) disposed within the gear case 20a and then the saw blade 22, which is disposed within the blade case 20, is driven by the gear train.

The blade case 20 may cover substantially the upper half of the saw blade 22. A safety cover 23 may cover and uncover substantially the lower half of the saw blade 22. Thus, the safety cover 23 may be pivotally mounted on the blade case 20, so that the safety cover 23 may pivot upward to uncover the saw blade 22 during the cutting operation.

Figure 3:
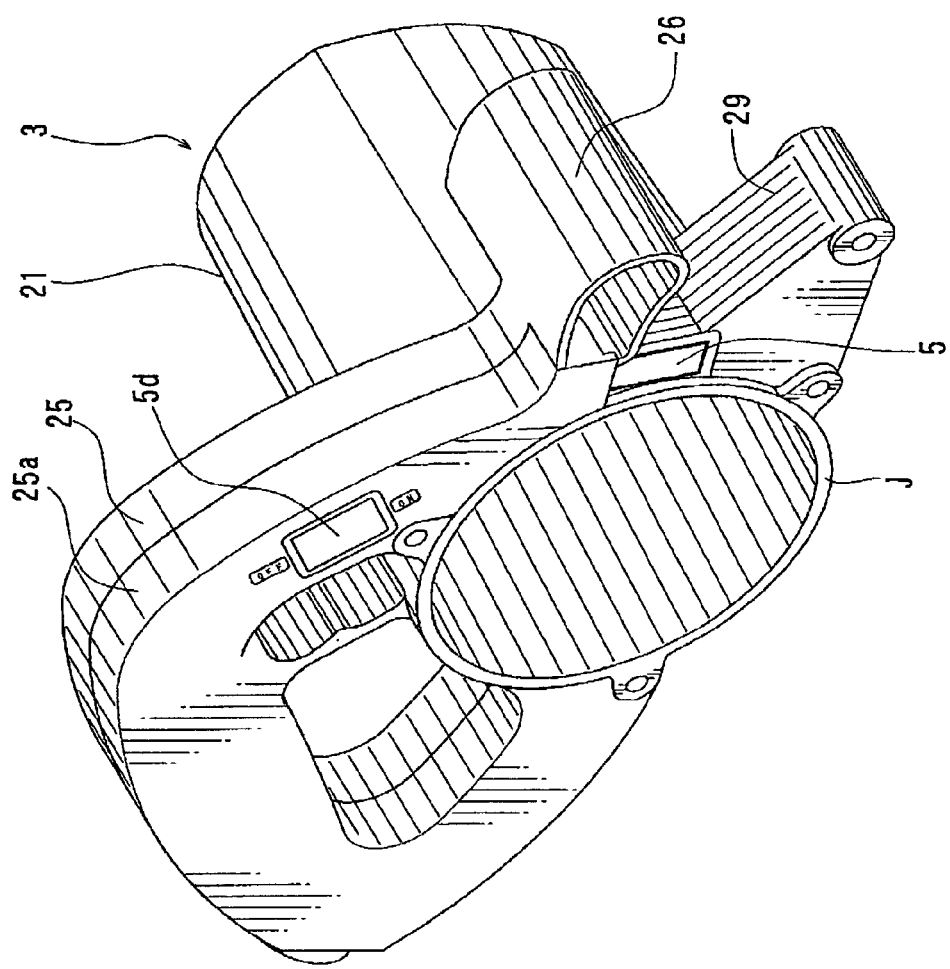
FIG. 3 is a perspective view of a motor case (housing) separated from the circular saw of FIG. 1.

In FIG. 3, the motor case 21 is shown separated from the gear case 20a and the blade case 20. The motor case 21 may include a substantially C-shaped main handle (rear handle) 25 and a grip portion (auxiliary or front handle) 26. The main handle 25 may extend obliquely and rearward from the upper portion of the motor case 21. The grip portion 26 may extend forwardly from the front portion of the motor case 21. A main switch 27 (see FIG. 1) may be disposed along the main handle 25 and may be operable to start and stop the motor. A power cord 28 (see FIG. 1) may extend from the rear portion of the main handle 25 and may be electrically connected to the motor via the main switch 27. The main handle 25 may comprise first and second handle halves, which may be separated by a plane that is parallel to the cutting direction. The first handle half may be disposed on the side opposite to the blade case 20 and may be configured as a cover portion 25a that can be separated from the second handle half. The cover portion 25a may be removably attached to the second handle half by a suitable engaging mechanism, such as a resilient hook, thereby permitting the inside structure of the main handle 25 to be exposed to the outside, if necessary.

Therefore, the operator can move the circular saw 1 along the workpiece W in the cutting direction while holding the main handle (rear handle) 25 with one hand and holding the grip portion (front handle) 26 with the other hand.

The pivotable arm 29 may be defined on the motor case 21 below the grip portion 26 and may extend or project forwardly from the motor case 21. Thus, the pivotable arm 29 and the grip portion 26 may be disposed on the front side of the motor case 21 and may be spaced from each other in the vertical direction by a suitable distance.

Figure 4:
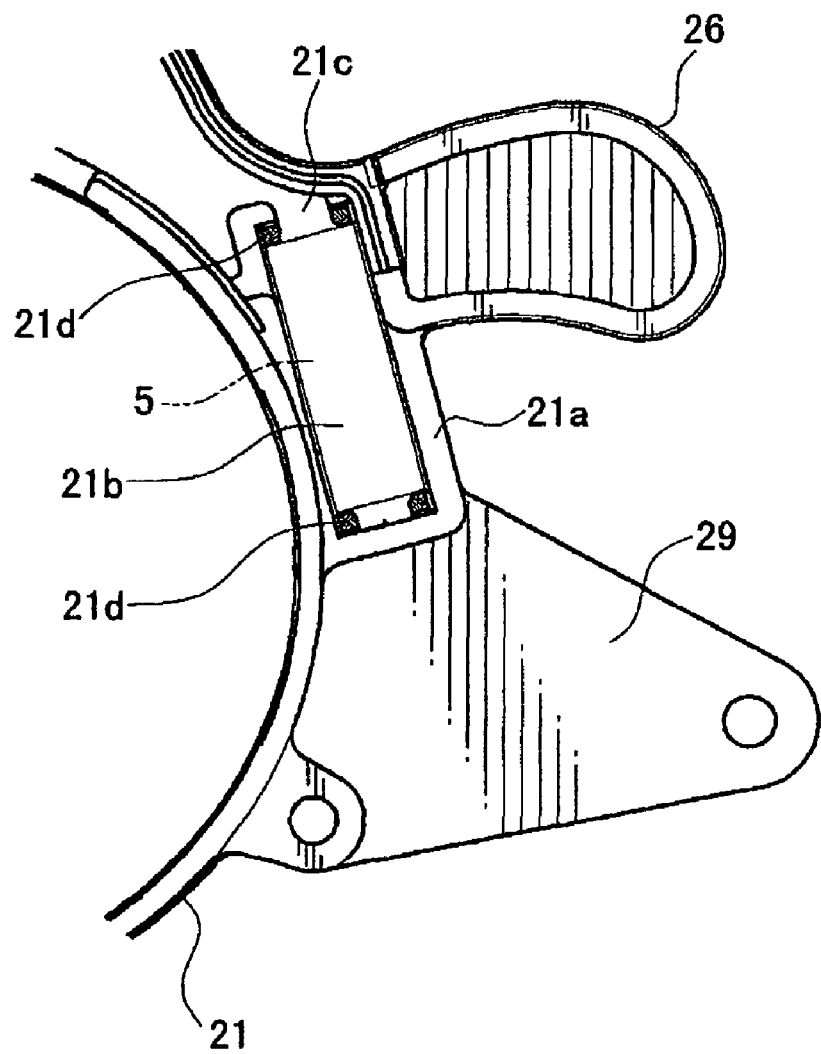
FIG. 4 is a partial side view of a front end of the motor case.

The lighting device 5 may be mounted within the motor case 21 in a position that is adjacent or proximal to a joining portion J defined on the gear casing 20a and adjacent or proximal to the base of the grip portion 26. For example, as shown in FIG. 4, the lighting device 5 may be disposed at an intermediate portion 21a between the base of the grip portion 26 and the base of the pivotable arm 29. The joining portion J also may be referred to as a joining surface J.

Figure 5:
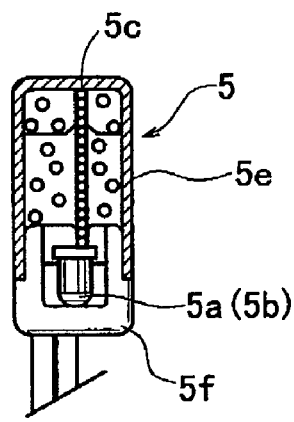
FIG. 5 is a cross-sectional view of a representative lighting device disposed within the representative circular saw.

Referring to FIGS. 4 and 5, the lighting device 5 may include a substantially rectangular casing (housing or cover) 5e, which casing 5e preferably may be made of a translucent or substantially transparent material. A circuit board 5c may be disposed within the casing 5e. First and second lights 5a and 5b may be mounted on the circuit board 5c. A transparent cover 5f may be attached to an opening that is defined within the casing 5e opposite to the first and second lights 5a and 5b. Thus, the lighting device 5 may be defined as a unit that includes the first and second lights 5a and 5b. Preferably, a synthetic resin may be molded into the casing 5e, so that cutting chips may be prevented from entering the interior of the casing 5e.

Optionally, the first and second lights 5a and 5b may comprise one or more light emitting diodes (LEDs) and may be electrically connected to a lighting switch 5d (see FIG. 3). The lighting switch 5d may be mounted on the right side of the main handle 25 in a position adjacent to the front side base portion of the main handle 25. Therefore, the first and second lights 5a and 5b may be turned ON and OFF when the lighting switch 5d is turned ON and OFF. Current may be supplied to the lighting device 5 from the power cord 28 via the lighting switch 5d.

Figure 6:
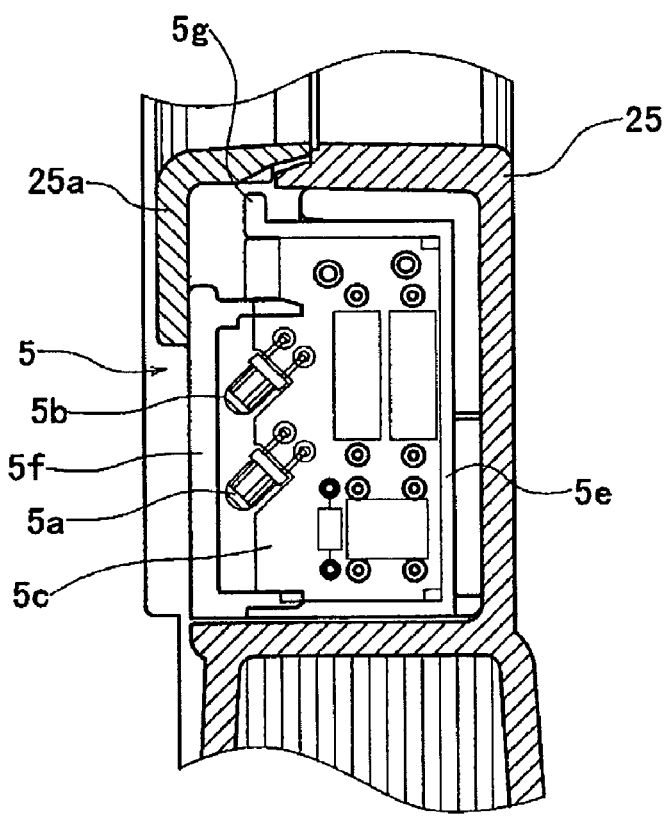
FIG. 6 is a vertical, cross-sectional view of the representative lighting device.

Referring to FIG. 4, a vertically elongated fitting recess 21b may be defined within the intermediate portion 21a and may extend a predetermined length. For example, the fitting recess 21b may have a substantially rectangular configuration that conforms to the configuration of the casing 5e of the lighting device 5. In addition, the fitting recess 21b may open towards the side opposite to the motor case 21. Therefore, the operator may insert the lighting device 5 into the fitting recess 21b with the first and second lights 5a and 5b positioned so as to face the operator. In the fitted state shown in FIG. 6, the end portion of the transparent cover 5f may contact the cover portion 25a of the main handle 25. In this case, the lighting device 5 may be prevented from being removed from the fitting recess 21b. The lighting device 5 may be easily removed from the fitting recess 21b by removing the cover member 25a from the main handle 25. For example, in order to facilitate the removal of the lighting device 5, a slot 21c may be defined within an upper wall of the fitting recess 21b. In this case, an appropriate removal tool may be inserted into the fitting recess 21b through the slot 21c so as to engage a projection 5g (see FIG. 6) defined on the casing 5e. Then, the casing 5e may be removed by using the removal tool as a lever.

Optionally, positioning guides 21d may be defined or provided at the four corners of the fitting recess 21b as viewed along a vertical cross section. Further, each of the positioning guides 21d may have a tapered guide surface. In this case, the casing 5e of the lighting device 5 may be smoothly fitted and reliably positioned into the fitting recess 21b. As described above, in the fitted state, the cover portion 25a of the main handle 25 may serve to prevent the casing 5e from being removed from the fitting recess 21b.

As best shown in FIG. 2, the first light 5a may be positioned so to illuminate the area around the portion of the workpiece W that will be cut. In addition, the second light 5b may be positioned in a different manner from the first light 5a such that the second light 5b illuminates the area around the first and second alignment edges 4a and 4b. For the purpose of illustrating the two illuminating directions, FIG. 2 shows the first light 5a positioned differently from the second light 5b along the vertical direction. However, the first light 5a optionally may be vertically aligned with the second light 5b, as shown in FIG. 5.

Moreover, the mounted position of the lighting device 5 on the intermediate portion 21a may be chosen such that the lighting device 5 is disposed adjacent to an exhaust window 20d defined within the front portion of the gear case 20a (see FIG. 2). Thus, in order to cool the motor within the motor case 21, cooling air may be drawn into the motor case 21 by a fan (not shown) and the cooling air may flow around the motor. The cooling air may then be exhausted from the motor case 21 via the exhaust window 20d as indicated by an arrow in FIG. 2. Therefore, a portion of the exhausted cooling air may flow around and over the lighting device 5. Further, as shown in FIGS. 1 and 2, the lighting device 5 is preferably positioned rearward of the front or leading edge of the circular saw blade 22.

According to the above representative portable circular saw 1, the first and second lights 5a and 5b may be disposed within the motor case 21 in a position adjacent to the base of the grip portion 26 and may be lit when the operator turns ON the main lighting switch 5d that is mounted on the main handle 25. Therefore, the first light 5a may illuminate the area around the portion C of the workpiece W that will be cut, as shown in FIG. 1. At the same time, the second light 5b may illuminate the area around the first and second alignment edges 4a and 4b. Because the first and second alignment edges 4a and 4b may be illuminated simultaneously with the illumination of the portion C of the workpiece W that will be cut, the operator can easily and accurately perform vertical or oblique cutting operations, because the position of the cutting edge of the circular saw blade 22 relative to the cutting line on the workpiece W, as well as the position of the first and second alignment edges 4a or 4b relative to the cutting line, will be well illuminated.

Further, because the first and second lights 5a and 5b naturally may be positioned at a higher position relative to the cut portion C and the first and second alignment edges 4a and 4b, the illuminating directions may be oriented obliquely downward toward the target portions. Therefore, the light emitted from the first and second lights 5a and 5b will not shine in the operator's eyes, which could hinder the cutting operation.

Furthermore, according to the representative circular saw 1, the lighting device 5 is mounted on the motor case 21 in a position adjacent to the joining portion J of the gear case 20a and adjacent to the base of the grip portion 26. In particular, the lighting device 5 is preferably mounted on the intermediate portion 21a of the motor case 21 that is positioned between the base of the grip portion 26 and the base of the pivotable arm 29. Therefore, the lighting device 5, i.e., the first and second lights 5a and 5b and their associated electrical components, preferably will not be damaged, even if the grip portion 26 or the pivotable arm 29 has been damaged as a result of accidentally dropping the circular saw 1. Thus, the position of the lighting device 5 is chosen to prevent damage from external forces due to dropping of the circular saw 1 or any other reasons. In addition, the lighting device 5 can effectively illuminate both the cut portion C and the first and second alignment edges 4a and 4b.

Further, it is noted that most of the cutting chips produced during the cutting operation will typically scatter toward the front side of the saw blade 22. According to the representative circular saw 1, the lighting device 5 is positioned rearward of the front or leading edge of the saw blade 22. Therefore, in accordance with this design, the cutting chips may be substantially prevented from reaching the lighting device 5. Consequently, the lighting device 5 may be reliably protected from any possible damage that may be caused by the scattered cutting chips. In addition, because the cooling air that has been exhausted from the exhaust window 20d may flow around and over the lighting device 5, the scattered cutting chips may be prevented from adhering to the lighting device 5. Further, the cooling air also may cool the first and second lights 5a and 5b if the first and second lights 5a and 5b generate heat when they are lit.

As described above, the second light 5b may emit the light from the lateral side of the grip portion 26 in a direction obliquely downward toward the first and second alignment edges 4a and 4b. According to this arrangement, the path of the light beams may be set so as to extend above the front pivotal support F by appropriately determining the position of the lighting device 5 and the configuration and the position of the front pivotal portion F. As a result, the light beams will not be interrupted or blocked by the front pivotal support F.

Further, if the lighting device 5, including the first and second lights 5a and 5b at the intermediate portion 21a, are positioned between the base of the pivotable arm 29 and the base of the grip portion 26, the electric lines between the first and second lights 5a and 5b and lighting switch 5d can be easily wired during assembly. In addition, the wiring operation is only necessary on the side of the motor case 21 and the electric lines are not required to extend between the motor case 21 and the blade case 20. Therefore, the circular saw 1 can be easily assembled and maintenance work can be facilitated.

The present invention is not limited to the above representative embodiment but may be modified in various ways without departing the spirit of the present invention.

For example, although a pair of lights 5a and 5b are utilized to illuminate the cut portion C and the first and second alignment edges 4a and 4b, respectively, in the above representative embodiment, one of the first and second lights 5a and 5b may be eliminated so as to illuminate only the cut portion C or the first and second alignment edges 4a and 4b. In addition, two separate lighting switches may be provided to turn ON and OFF the first light 5a and the second light 5b, independently of each other.

Although power is supplied from an AC power source to the lighting device 5 via the power cord 28, which is also connected to the motor for driving the circular saw blade 22, the lighting device 5 may have its own power source, such as a battery. Further, because the first and second lights 5a and 5b are LEDs in the representative embodiment, the LEDs will not cause the grip portion 26 to become hot when illuminated, because LEDs typically do not generate much heat. However, the first and second lights 5a and 5b may be replaced with any other types of lights, such as incandescent lamps (midget lamps) and fluorescent lamps.

Further teachings for practicing the present teachings and/or modifying the present teachings are provided in commonly-assigned U.S. Pat. No. 6,318,874, US Patent Publication Nos. 2001-0029819, 2001-0037578, 2002-0057568 and U.S. patent application Ser. Nos. 09/570,035, 09/628,928 and 09/637,906, all of which are incorporated by reference as if fully set forth herein. Naturally, the present teachings can be combined with the teachings of one or more of these references in order to provide additional useful embodiments of the present teachings.

The invention claimed is:

1. A cutting tool, comprising:
   a tool unit, including
   a motor case;
   a blade case for covering a blade;
   a gear case positioned between the motor case and the blade case, wherein the gear case includes an exhaust portion; and
   a handle extending radially outward from the motor case;
   a shoe arranged and constructed to support the tool unit with respect to a workpiece, the shoe being coupled to the tool unit via a pivotable arm that extends from the motor case; and
   a lighting device positioned in a compartment mounted on the motor case, wherein the compartment includes a first side and a second side opposite the first side, wherein the compartment is positioned at an intermediate position between the handle and the pivotable arm, and wherein the first side of the compartment is directly attached to the handle and the second side of the compartment is directly attached to the pivotable arm, further wherein the compartment includes a transparent cover substantially parallel to the blade, said transparent cover allowing light to be emitted to a location outside of the tool unit, and further wherein the lighting device is positioned opposite the blade case and in front of the gear case.

2. A cutting tool as in claim 1, wherein the lighting device comprises at least a first light and a second light that are arranged and constructed to illuminate different areas.

3. A cutting tool as in claim 2, wherein the first light is arranged and constructed to illuminate a portion of the workpiece, and the second light is arranged and constructed to illuminate an area in front of the shoe.

4. A cutting tool as in claim 1, wherein air from the exhaust portion is capable of contact with the lighting device.

5. A cutting tool as in claim 1, wherein the lighting device comprises at least a first light and a second light that are arranged and constructed to illuminate the same area.

6. A cutting tool as in claim 1, further comprising a cutting blade having a front or leading edge defined in a cutting direction with respect to the workpiece and the lighting device is positioned rearward of the front or leading edge of the cutting blade.

7. A cutting tool as in claim 1, wherein the gear case is joined to the motor case at a joining portion defined on the motor case, and the lighting device is disposed proximal to the joining portion.

8. A cutting tool as in claim 7, wherein the lighting device is positioned in a fitting recess, further wherein the handle, the joining portion, and the pivotable arm each are positioned adjacent a side of the fitting recess.

9. A cutting tool as in claim 8, wherein the transparent cover is substantially parallel to a joining surface of the joining portion.

10. A cutting tool as in claim 9, wherein a portion of the handle is positioned over a portion of the fitting recess to secure the fitting recess to the motor housing.

11. A cutting tool as in claim 1, wherein at least one of the first and second lights comprises a light emitting diode.

12. A cutting tool as in claim 1, wherein the transparent cover is substantially parallel to a joining surface of the joining portion.

13. A cutting tool as in claim 1, wherein the handle includes a grip portion positioned toward a front portion of the handle.

14. A cutting tool, comprising:
   a tool unit, including
   a motor case;
   a blade case for covering a blade;
   a gear case positioned between the motor case and the blade case, wherein the gear case includes an exhaust portion; and
   a handle including a first member and a second member, wherein the second member is a grip portion, further wherein the handle extends from the motor case;
   a shoe arranged and constructed to support the tool unit with respect to a workpiece, the shoe being coupled to the tool unit by a pivotable arm that extends from the motor case; and
   a lighting device positioned in a compartment on the motor case, wherein the compartment includes a first side and a second side opposite the first side, wherein the compartment is directly connected to the handle and the pivotable arm, and wherein the first side of the compartment is attached to the handle and the second side of the compartment is attached to he pivotable arm, further wherein the lighting device is positioned opposite the blade case and in front of the gear case, and further wherein the compartment includes a transparent cover substantially parallel to the blade.

15. A cutting tool as in claim 14, wherein the lighting device comprises at least a first light and a second light that are arranged and constructed to illuminate different areas.

16. A cutting tool as in claim 15, wherein the compartment includes a transparent cover substantially parallel to a joining surface of a joining portion.

17. A cutting tool as in claim 16, wherein air from the exhaust portion is capable of contact with the lighting device.

18. An apparatus, comprising:
a motor housing having a first side defining a joining member;
a blade housing for a blade;
a gear housing positioned between the motor housing and the blade housing;
a handle extending radially outward from the motor housing, wherein a first base portion is defined between the handle and the motor housing;
a pivotable arm extending radially outward from the motor housing, wherein a second base portion is defined between the pivotable arm and the motor housing;
a lighting device positioned in a compartment disposed on the motor housing adjacent to and a distance away from the gear housing, wherein the compartment includes a first side and a second side opposite the first side, wherein the compartment is disposed between the first base portion, the second base portion, and the joining member; and wherein the first side of the compartment is directly attached to the handle and the second side of the compartment is directly attached to the pivotable arm; wherein the compartment includes a transparent cover substantially parallel to the blade; and
a shoe coupled to the pivotable arm.

19. An apparatus as in claim 18, further comprising a cutting blade disposed within the blade housing and having a leading edge, wherein the lighting device is disposed rearward of the leading edge.

20. An apparatus as in claim 18, wherein the lighting device comprises a first light and a second light, the first light is arranged and constructed to illuminate a portion of a workpiece, and the second light is arranged and constructed to illuminate a front portion of the shoe.

21. An apparatus as in claim 18, wherein the gear housing further comprising an exhaust window configured to release air from the motor housing to the outside, wherein the lighting device is positioned adjacent to the exhaust window.

22. An apparatus as in claim 18, further comprising a lighting switch mounted on a rear portion of the handle, wherein the lighting switch is electrically connected to the lighting device and is operable to turn ON and OFF the lighting device.

23. An apparatus as in claim 18, wherein the lighting device includes a cover that is substantially parallel to the first side of the motor housing.

24. An apparatus as in claim 18, wherein the lighting device includes a fitting member, further wherein a portion of the handle is positioned over a portion of the fitting member.

25. An apparatus as in claim 18, wherein the handle includes a front portion and a rear portion, wherein the rear portion includes a switch capable of turning on the lighting device.

* * * * *